(12) United States Patent
Coykendall et al.

(10) Patent No.: US 7,256,221 B2
(45) Date of Patent: Aug. 14, 2007

(54) LOW OUTGASSING PHOTO OR ELECTRON BEAM CURABLE RUBBERY POLYMER MATERIAL, PREPARATION THEREOF AND DEVICE COMPRISING SAME

(75) Inventors: Kelsee L. Coykendall, Henrietta, NY (US); Paul G. Dewa, Newark, NY (US); Robert Sabia, Corning, NY (US); David C. Sauer, Horseheads, NY (US); Paul J. Shustack, Elmira, NY (US); Kamal K. Soni, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 123 days.

(21) Appl. No.: 10/703,800

(22) Filed: Nov. 7, 2003

(65) Prior Publication Data

US 2004/0092618 A1 May 13, 2004

Related U.S. Application Data

(60) Provisional application No. 60/424,958, filed on Nov. 7, 2002.

(51) Int. Cl.
| | |
|---|---|
| C08J 3/28 | (2006.01) |
| G03C 1/72 | (2006.01) |
| G03F 7/028 | (2006.01) |
| C08F 36/04 | (2006.01) |
| C08F 110/02 | (2006.01) |
| C08F 110/04 | (2006.01) |

(52) U.S. Cl. .......................... 522/14; 522/16; 522/23; 522/31; 522/39; 522/42; 522/46; 522/53; 522/64; 522/66; 522/83; 522/157; 522/158; 522/161

(58) Field of Classification Search .............. 522/81, 522/83, 120, 121, 142, 141, 157, 158, 159, 522/160, 161, 129, 64, 39, 66, 53, 46, 31, 522/14, 16, 23, 42

See application file for complete search history.

(56) References Cited

U.S. PATENT DOCUMENTS

| | | | |
|---|---|---|---|
| 4,855,382 A | | 8/1989 | Vanhaeren ............... 528/45 |
| 5,352,712 A | * | 10/1994 | Shustack ................. 522/31 |
| 5,491,193 A | * | 2/1996 | Erickson ................. 525/65 |
| 5,536,529 A | * | 7/1996 | Shustack ............... 427/163.2 |
| H001597 H | * | 9/1996 | Erickson ................. 522/158 |
| 5,641,823 A | * | 6/1997 | Masse et al. ............. 524/270 |
| 6,350,792 B1 | * | 2/2002 | Smetana et al. .......... 522/81 |
| 6,619,126 B2 | * | 9/2003 | Orten ....................... 73/649 |
| 6,664,318 B1 | * | 12/2003 | Bymark et al. ........... 524/261 |
| 6,726,856 B2 | | 4/2004 | Glausch .................... 252/520 |

FOREIGN PATENT DOCUMENTS

| | | |
|---|---|---|
| EP | 302 620 | 8/1987 |
| JP | 2001-057065 | 2/2001 |
| JP | 2001-155855 | 6/2001 |
| JP | 2001-163931 | 6/2001 |
| JP | 2001-164737 | 6/2001 |
| JP | 2002-106719 | 4/2002 |
| JP | 2002-146230 | 5/2002 |

OTHER PUBLICATIONS

E.A. Boulter, M. Cohen, M.L. Deviney, *Proceedings of the Electrical/Electronics Insulation Conference* (1997), 23rd, 249-53.
R.C. Benson, T.E. Phillips, N. DeHaas, *Proc.-Electron. Compon, Conf.* (1989), 39th, 301-8.
Also R.C. Benson, T.E. Phillips, N. DeHaas, M. Bonneau, *Int. SAMPE Electron,Conf.* (1990), 4 (Electorn). Mater.-Our Future), 267-81.
C.T. Mooney, J.C. Bolger, *Natl. SAMPE Symp. Exhib., [Proc.]*, (1984), 29th (Technol. Vectors), 639-50.
Leoni; FATIPEC Congress (2000), 25th (vol. 1), 253-265.
J. Kuczynski, *J. of Adhesion* (1996), 56 (1-4), 107-119.
R.C. Benson, B.H. Nall, N. DeHaas, B.M. Romenesco, B.M. Charles, H.K. Colten, *Electronic Mater, Processes, Int. SAMPE Electronic Conf.* (1987), 637-48.
R.C. Benson, B.H. Nall, N. DeHaas, B.M. Romenesco, B.M. Charles, H.K. Colten, *SAMPE journal*; Nov./Dec. (1987), 27-33.

* cited by examiner

*Primary Examiner*—Susan Berman
(74) *Attorney, Agent, or Firm*—Siwen Chen; Robert P. Santandrea

(57) ABSTRACT

Disclosed are photo or electron beam polymerizable compositions, and preparation thereof and devices containing them. The composition contains completely or substantially completely hydrogenated hydrocarbon-based material completely free or substantially free of carbon-carbon double and triple bonds containing photo or electron beam curable terminal or pendant groups, low-outgassing photoinitiators, an optional viscosity adjustment component and an optional filler. The composition is visible light, UV or electron beam curable. It cures into a low-modulus, low outgassing polymer material. The composition can be used as an adhesive, sealant or lens potting material. It is ideal for use in lithographic tools involving deep or vacuum ultraviolet radiations, in particular, as lens potting materials for 157 nm lithographic tools.

14 Claims, 4 Drawing Sheets

LOW OUTGASSING PHOTO OR ELECTRON BEAM CURABLE RUBBERY POLYMER MATERIAL, PREPARATION THEREOF AND DEVICE COMPRISING SAME

CROSS REFERENCE TO RELATED APPLICATION

This application claims priority of U.S. provisional patent application Ser. No. 60/424,958, filed on Nov. 7, 2002, entitled "Low Outgassing Photo or Electron Beam Curable Rubbery Polymer Material," by Paul J. Shustack, the disclosure of which is incorporated herein by reference in its entirety.

FIELD OF THE INVENTION

The present invention relates to UV, visible light or electron beam curable, rubbery material, preparation thereof and device comprising the same. In particular, the present invention relates to UV, visible light or electron beam curable rubbery material that after being cured exhibits exceedingly low outgassing of volatile organic materials, as well as preparation thereof and device comprising the same. The present invention is useful, for example, as an adhesive, sealant, or lens-potting material.

BACKGROUND OF THE INVENTION

There are a number of applications where it is necessary to bond materials together using adhesives and it is undesirable for the adhesive to give off any volatile organic materials after cure. The process of evolving volatile organic materials after cure is often called outgassing or offgassing. Examples of such applications are in the area of food packaging where the outgassed compounds can impart an off-taste to the packaged food material. In the area of optics and photonics, outgassed compounds can condense on optical surfaces and negatively affect the transmission of light.

For many adhesive or lens potting applications, it is necessary to bond together materials (substrates) of different coefficients of thermal expansion. In these applications, the adhesive or potting material must allow for the expansion and contraction of the two different substrates as the temperature changes yet still maintain the adhesion of the two substrates together. This requires the use of a soft, low modulus, low $T_g$ rubbery type material. The ability to formulate materials that cure to soft, compliant, rubber-like solids and yet still have low outgassing after cure is very difficult. This is especially true if the cured material also has to have excellent thermal, oxidative and hydrolytic stability.

Many room temperature vulcanized (RTV) silicone materials cure to soft, compliant rubber-like solids that have good thermal, oxidative and hydrolytic stability but they still evolve an unacceptable amount of volatiles after cure. The outgassed products of the RTV silicones are usually low molecular weight, sometimes cyclic, siloxanes. These materials are particularly problematic because if they condense on surfaces, they are difficult to remove due to their very low surface tension.

Other materials often considered are polysulfides, polyurethanes, and hydrocarbon rubbers like polybutadiene, polyisoprene, etc. These products do not possess sufficient thermal, oxidative and hydrolytic stability for applications where the rubbery material must remain rubbery throughout its entire lifetime which may be as long as 30 years. Such applications are in the optics and photonics area where in order to simulate 30 year lifetime, materials are subjected to various accelerated aging tests like exposure to conditions of 85° C. and 85% RH for a minimum of 500 hours and up to as long as 2000 hours.

It is also advantageous for the material to be curable with actinic radiation such as UV or visible light or an electron beam. This enables the material to be applied as a liquid, then optical alignments, or other positional adjustments can be made. When the adherends are in their optimized position, the actinic radiation can be turned on which cures the materials quickly (within seconds or minutes) and with minimal amount of heat. This process retains the delicate alignment of the adherends.

Engineering solutions have been proposed to eliminate or mitigate the outgassed products from adhesives. These involve novel joint designs that allow for elimination of the outgassed materials from the adhesive into non-sensitive areas (JP 2001155855 and JP 2002106719). In another case, the surface of the adhesive material is coated with an impervious inorganic layer that seals in possible outgassed products (US2001028062). Other methods involve heat and/or vacuum treatments of the cured adhesive to remove possible outgassed products prior to final assembly of the device. All of these methods require extra steps that are unnecessary if a true low outgassing adhesive, sealant, or potting compound were available.

JP 2002146230 by H. Kawakami et al. describes an adhesive composition that is for semiconductor-mounted circuit boards and devices therewith. This composition gives a B-stage adhesive film containing less volatile components. However, the composition is not UV curable, contains MEK solvent, and is based on bisphenol A epoxy and phenolic resins which require heat to cure and cure to hard, non-flexible, thermoset polymers.

E. A. Boulter et al. claims zero volatile release from their high service temperature polyether amide thermoset resins. These materials are not UV curable and require a cure schedule of 1 hour at 177° C. followed by a postcure at 225° C. The final cured properties resemble that of cured bisphenol A type epoxies. See E. A. Boulter, M. Cohen, M. L. Deviney, *Proceedings of the Electrical/Electronics Insulation Conference* (1997), 23rd, 249-53.

JP 2001164737 by I. Tanaka et al. describes using low out-gas adhesives to make floor sheets useful for clean rooms. The adhesives are of the two component epoxy resin-polyamideamine class. Such materials require the mixing of the two parts (an extra manufacturing step), are not photocurable, and cure to form polymers that are not low $T_g$ rubbers.

JP 2001057065 by K. Fukuda et al. describes sealant compositions for computer hard disc drives that claim no gas volatilization, good sealability and adhesive strength. EP302620 by G. M. Vanhaeren describes a crosslinkable hot-melt adhesive containing a polyol and a blocked isocyanate that provides a flexible heat-resistant bond without forming volatiles. However, both of the above materials must be applied as hot melts and the high temperatures involved would negatively effect the delicate alignment required for many optical devices.

R. C. Benson et al. and C. T. Mooney et al. investigated the measurement of volatile organic species that evolve during cure and after post-cure processing of epoxy or polyimide based die attach adhesives. Similar studies were performed by R. C. Benson et al. on adhesives for microelectronics. These formulations are not photocurable and also do not cure to the soft rubbery type polymers required for the application. See R. C. Benson, T. E. Phillips, N.

DeHaas, *Proc.-Electron. Compon Conf.* (1989), 39th, 301-8. See also R. C. Benson, T. E. Phillips, N. DeHaas, M. Bonneau, *Int. SAMPE Electron, Conf.* (1990), 4 (Electorn). Mater.-Our Future), 267-81. See also C. T. Mooney, J. C. Bolger, *Natl. SAMPE Symp. Exhib., [Proc.]*, (1984), 29th (Technol. Vectors), 639-50.

R. Leoni describes adhesives that have very low emissions of volatile organic compounds. Such adhesives are high tack, contact adhesives intended for floor coverings, tiles, carpets, vinyl sheeting, etc. These materials are not photocurable and are not suitable for this application due to their permanent tackiness. See R. Leoni; FATIPEC Congress (2000), 25th (Vol. 1), 253-265.

J. Kuczynski studied the possibility of eliminating the outgassing from UV curable adhesives. Such outgassed products were shown to corrode thin film magnetic discs. The volatility of the corrosive species was dependent on the adhesive's glass transition temperature which varied linearly with flexibilizer concentration. Thermogravimetric analysis revealed that outgassing was reduced an order of magnitude in adhesives containing reduced concentrations of polycaprolactone based flexibilizer. See J. Kuczynski, *J. of Adhesion* (1996), 56 (1-4), 107-119. For the current application, it is desirable to simultaneously have a low $T_g$ and low outgassing. Also, polycaprolactone type materials are undesirable due to their inherent hydrolytic instability.

Finally, JP 2001163931 by Y. Arai and T. Nemoto describes photocurable sealing compositions generating a reduced amount of volatile gas for electronic devices. Such compositions are based on a high MW (~50,000) urethane (meth)acrylate synthesized from a polypropylene glycol extended bisphenol A diol, tetrahydrofurfuryl acrylate, and phenoxy ethyl acrylate. Such compositions would not have the outstanding thermal and oxidative stability or the higher, inherent hydrophobicity of the present invention.

There remains a genuine need of an adhesive material that is photo or electron beam curable, and that upon being cured forms a material with low outgassing rate, low modulus and low $T_g$ that is suitable for use in, inter alia, the optics area.

SUMMARY OF THE INVENTION

In a first aspect, the present invention provides a composition of matter consisting essentially of a mixture, blend and/or reaction product of:

(i) a photo or electron beam curable material component based on a completely or substantially completely hydrogenated hydrocarbon based rubber material completely or substantially free of carbon-carbon double and triple bonds;

(ii) a photoinitiator/photosensitizer component having essentially no volatility at room temperature and also yield photoproducts after exposure to actinic radiation that have minimal or no volatility at room temperature;

(iii) an optional viscosity adjustment component that is either homopolymerizable or is capable of copolymerizing with the photo or electron beam curable material component of (i); and (iv) an optional inert filler.

In a second aspect of the present invention, it is provided a process for producing a composition of matter having low outgassing rate and low mudulus, comprising the following steps of:

(A) providing a completely or substantially completely hydrogenated hydrocarbon-based rubber material (i) completely or substantially completely free of carbon-carbon double bond and triple bond having terminal and/or pendant groups that are photo and/or electron beam polymerizable;

(B) mixing the material (i) with a photoinitiator/photosensitizer (ii) having essentially no volatility at room temperature and also yielding photoproducts after exposure to actinic radiation that have minimal or no volatility at room temperature; (iii) an optional viscosity adjustment component that is either homopolymerizable or is capable of copolymerizing with material (i); and (iv) an optional inert filler;

(C) curing the mixture resulting from step (B) by visible light, UV light or electron beam to form a composition of matter having low outgassing rate and low modulus.

According to an embodiment of the process of the present invention, the step (A) includes the following steps (A1) and (A2):

(A1) providing a completely or substantially completely hydrogenated hydrocarbon-based rubber material (i') completely or substantially completely free of carbon-carbon double bond and triple bond having reactive terminal and/or pendant groups;

(A2) modifying the rubber material (i') into material (i) by introducing photo and/or electron beam polymerizable terminal and/or pendant groups to the rubber material (i') by allowing the reactive terminal and/or pendant groups of (i') to react with agents having the photo and/or electron beam polymerizable groups.

Preferably, in the composition of matter of the present invention, the photo or electron beam curable material component of (i) is a functionalized material selected from the group consisting of: polybutadiene, polyisoprene, polyethylene propylene rubber and combinations thereof, said material being completely hydrogenated or substantially completely hydrogenated and free or substantially free of carbon-carbon double and triple bonds. Preferably, the photo or electron beam curable material component of (i) is functionalized by at least one polymerizable terminal or pendant group selected from: acrylate, methacrylate, acrylamide, maleimide, thioacrylate, thiomethacrylate, vinyl sulfide, itaconate, crotonate, styrene and N-vinyl amide, hydroxyl, thiol, epoxy, oxetane, episulfide, vinyl ether, propenyl ether, allyl ether, and compatible mixtures and/or combinations thereof. Most preferably, the photo or electron beam curable material component of (i) is functionalized by at least one polymerizable terminal or pendant group selected from acrylate, methacrylate and epoxy.

The composition of matter of the present invention after exposure to actinic radiation or electron beam cures to a soft, rubbery polymer that exhibits an exceedingly low amount of outgassing of volatile organic materials. Such material is useful as an adhesive, sealant, or lens-potting compound. Such cured material constitutes part of the subject matter of the present invention. The cured material has preferably a low modulus and a low $T_g$ of lower or equal to 25° C.

The composition of matter of the present invention can be used as an adhesive or sealant. Such use can be advantageously in applications where low outgassing of the adhesive is required. For example, the composition of matter of the present invention can be used in clean rooms. Preferably, the composition of matter of the present invention is used in devices containing elements susceptive and sensitive to outgassed species from the materials, such as lenses used in deep and vacuum ultraviolet photolithography involving using UV radiation having wavelength of, for example, 248 nm or shorter. The composition of matter is particularly advantageous for use in connection with 157 nm photolithography as lens potting materials owing to its low outgassing even when exposed to 157 nm irradiation.

Thus accordingly, a third aspect of the present invention is concerned with a device comprising the cured composition of matter of the present invention as an adhesive or sealant. The device is advantageously a lithographic device involving using deep or vacuum ultraviolet radiation. The lithographic radiation of the device can have a wavelength as low as 157 nm, and even shorter. The cured composition of matter of the present invention is advantageously used as lens potting material in the lithographic device. The lens may be made of, for example, doped or undoped high purity fused silica, or crystalline $CaF_2$ optionally coated with antireflective coatings.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
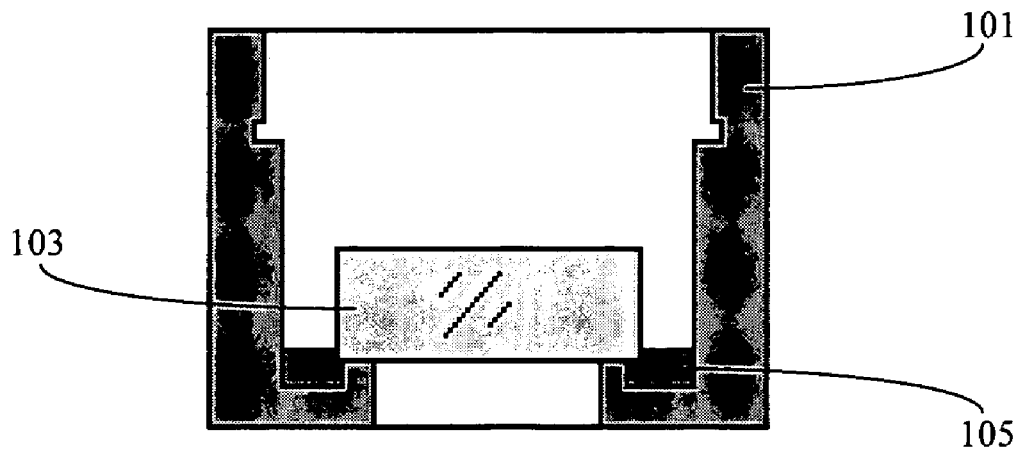
FIG. 1 is a schematic illustration of the cross-section of a lens element potted with the polymer lens-potting material of the present invention.

The composition of matter of the present invention contains as a first component a photo or electron beam (EB) curable material based on a completely or substantially hydrogenated hydrocarbon based rubber. The rubber can be based on, for example, polybutadiene, polyisoprene, polyethylene propylene rubber (EPR), and combinations thereof, and the like. The hydrocarbon chain of such rubber must be completely or substantially free of carbon-carbon double or triple bonds. Normally, this is achieved by hydrogenation of the rubber backbone. The hydrogenated rubber materials are functionalized with a group that renders the rubber molecules polymerizable. Such polymerization must occur in the presence of actinic radiation or electron beam. A photoinitiator/photosensitizer may be necessary to initiate said polymerization. As used herein, the term "photoiniator/photosensitizer" means a photoiniating system for photo or electron beam polymerization comprised of one or more photoiniators and optionally one or more photosensitizers. The polymerizable group on the hydrogenated rubber may be terminal or pendant. The group may be free radically or cationically polymerizable. Examples of free radically polymerizable groups are, but not limited to, acrylate, methacrylate, acrylamide, maleimide, thioacrylate, thiomethacrylate, vinyl sulfide, itaconate, crotonate, styrene, and N-vinyl amides, and the like. Examples of cationically polymerizable groups include, but are not limited to: epoxy, oxetane, episulfide, vinyl ether, propenyl ether, allyl ether, and the like. The thiol functional group is also useful especially if stoichiometrically balanced with an ene functional material in the composition as in the well known thiolene photopolymerization. The preferred functional groups are epoxy, acrylate, and methacrylate.

The hydrogenated rubber, if initially functionalized with hydroxyl, amino, or thiol groups, can be first reacted with an excess of a di- or triisocyanate functional compound to form the corresponding urethane, urea, or thiourethane compound. Then the material can be end-capped by reacting it with a hydroxyl functional molecule that also has a free radically or cationically polymerizable group (e.g. hydroxyethyl acrylate, hydroxybutyl vinyl ether, etc). This type of functionalization of the hydrogenated rubber results in a urethane, urea, or thiourethane material with a hydrogenated rubber backbone and end-capped with free radical or cationically polymerizable functional groups.

The functionalized hydrogenated rubber material, if a liquid of an acceptable viscosity for the desired application, can be mixed directly with the proper non-volatile photoinitiator/photosensitizer and photocured. If viscosity adjustment is necessary, any copolymerizable or simultaneously polymerizable component may be used. This component must be compatible with the hydrogenated rubber material. This component must not generate detrimental amount of volatile organic compounds when exposed to UV irradiation when the composition is being cured or used.

If an electron beam is used to induce the polymerization, a photoinitator is only necessary if cationic polymerization is desired. For WV or visible light photocure, a photoinitiator/photosensitizer is necessary. The photoinitiator/photosensitizer component must be non-volatile and also not yield photoproducts that are volatile. Examples of commercially available free radical photoinitiators are but not limited to: Cyracure 6974, Cyracure 6976, Cyracure 6990 and Cyracure 6992 available from Dow Chemical; Esacure KIP 150, Esacure KIP 75 LT and Esacure 1001 available from Lamberti S.p.A; Irgacure 819, 369, 784; CGI 113, 124, 403, and 754 from Ciba Geigy Chemicals Corp.; Chivacure 3482 from Chitec Chemical Co.; ITX, LTX, MEAB and IPPBP from Albermarle Corp.; and BMDS, CTX, CPTX, DETX, and PDA from Aceto Corp. Suitable cationic photoinitiators are but not limited to Rhodorsil 2074 from Rhodia Inc., Sarcat CD-1012, from Sartomer Co., and UV9380C, UV9385C, UV9390C, and UV9392C from General Electric Co. The following compounds, mixtures and compatible combinations thereof, in purified or diluted versions, may be advantageously used as the photoinitiators in the present invention:

- oligo [2-hydroxy-2-methyl-1-[4-(1-methylvinyl)phenyl] propanone];
- oligo [2-hydroxy-2-methyl-1-[4-(1-methylvinyl)phenyl] propanone], diluted in tripropylene glycol diacrylate (25% TPGDA);
- 1-[4-(4-benzoylphenylsulfonyl)phenyl]-2-methyl-2-(4-methylphenylsulfonyl)propan-1-one;
- bis(2,4,6-trimethylbenzoyl)-phenyl phosphine oxide;
- 2-benzyl-2-N,N-dimethylamino-1-(4-morpholino-phenyl)-1-butanone;
- bis $\eta^5$-(2,4-cyclopentadien-1-yl) bis(2,6-difluoro-3-(1 H-pyrrol-1-yl)phenyl)titanium;
- bis (2,6-dimethoxybenzoyl)-2,4,4-trimethylpentyl phosphine oxide;
- 2-oxepanone, homopolymer, 2-[[4-[2-methyl-2-(4-morpholinyl)-1-oxopropyl]phenyl]thio]ethyl ester;
- mixture of 2-isopropylthioxanthone and 4-isopropylthioxanthone;
- 1,3-dimethyl-2-hydroxy-9H-thioxanthen-9-one, 2-ethylhexyl ester;
- 4,4'-bis(methylethylamino)benzophenone;
- 4,4'-bis(isopropylphenoxy)benzophenone;
- 4-benzoyl-4'-methyldiphenyl sulfide;
- 2-chloro-thioxanthone;
- 1-chloro-4-propoxythioxanthone;
- 2,4-diethylthioxanthone;
- poly[oxy(methyl-1,2-ethanediyl)], α-[4-(dimethylamino) benzoyl-ω-butoxy-;
- 2,2'-bis-(2-chlorophenyl)-4,5,4',5 '-tetraphenyl-2'H-<1, 2'>biimidazolyl;
- (tolylcumyl)iodonium tetrakis(pentafluorophenyl) borate;
- [4-[(2-hydroxytetradecyl)oxy]phenyl]phenyliodonium hexafluoro antimonate;
- mixture of bis(4-dodecylphenyl)iodonium hexafluoroantimonate, isopropylthioxanthone, and $C_{12}+C_{14}$ alkylglycidyl ethers;
- mixture of bis(4-dodecylphenyl)iodonium hexafluoroantimonate and $C_{12}+C_{14}$ alkylglycidyl ethers;
- phenyl-4-octyloxyphenyl iodonium hexafluoro antimonite;
- mixture of triaryl sulfonium hexafluoroantimonate salts; and
- mixture of triaryl sulfonium hexafluorophosphate salts.

The following photosensitizers may be used as well in the composition of matter of the present invention if desired:

- perylene;
- anthracene;
- 1,2-benzanthracene;
- 9-n-butoxyanthracene;
- 9,10-di-n-butoxy anthracene;
- 9,10-di-n-propoxy anthracene;
- 9,10-diethoxy anthracene;
- anthrone;
- pyrene;
- 2-ethyl-9,10-dimethoxy anthracene;
- 2,5-diphenyl-1,3,4-oxadiazole;
- diphenyl anthracene;
- 9,10-dimethylanthracene;
- 1,3-diphenyl-2-pyrazoline;
- 1,3-diphenylisobenzofuran;
- N,N,N',N'-tetraphenyl benzidine; and
- N,N,N',N'-tetraphenyl phenylene diamine.

It is also possible to blend the free radical polymerizable materials with the cationically curable materials and then on exposure to actinic radiation, both materials simultaneously cure.

Similar to other sealants and adhesives, various inert fillers, particularly inorganic fillers can be used in the composition of matter of the present invention. These fillers may be added to the composition to improve the physical properties of the cured product, and also to modify the rheology of the uncured materials. They can be reinforcing or non-reinforcing. Reinforcing filler may contain surface moieties capable of strong interactions with the cured polymer matrix. They may function to increase the strength and modulus of the cured adhesive. Understandably they may also alter the viscosity of the uncured composition. The extent of such effects is dependent on factors such as filler loading, particle size, shape, and surface chemistry. As non-limiting examples of such fillers, mention can be made of alumina, crystobalite, aluminum trihydroxide, talc, feldspar, calcium carbonate, mica, clay, wallastonite, nepeleline syenite, silica, and the like. Preferably, silica is used as the inert inorganic filler. Preferably, these fillers are those as transparent to the curing UV light as possible so as not to significantly inhibit the UV curing of the composition where UV curing is used. In the case of cationically cured formulations, the filler should be non-alkaline so as not to inhibit the acid cure. For free radically cured systems, the pH of the filler is not as important. The amount of the filler used can range from 0-90%, preferably 0-75%, more preferably 0-50%, by weight of the total composition. Particle size of the fillers should be less than 125 μm, preferably less than 50 μm and more preferably less than 10 μm.

The composition of matter of the present invention can be cured by visible light, UV radiation or by electron beam. One skilled in the art can choose the proper equipment and curing time to fully cure the formulation having the specific composition to a bulk material. For example, when using UV curing at 365 nm, the composition may be advantageously fully cured within 2 hours, preferably within 1 hour, more preferably within 30 minutes, most preferably within 15 minutes. The curing process can be effected at room temperature. It generally does not generate substantial heat, and can be carried out after the uncured composition has been applied. These advantages render the adhesive composition of the present invention particularly suitable for attaching elements of precision devices sensitive to high temperature.

The cured product of the composition of the present invention advantageously has a low modulus ranging from 25 to 10,000 psi ($1.7 \times 10^5$ to $6.8 \times 10^7$ Pa), preferably from 50 to 5,000 psi ($3.4 \times 10^5$ to $3.4 \times 10^7$ Pa), more preferably from 100 to 2,500 psi ($6.8 \times 10^5$ to $1.7 \times 10^7$ Pa).

The adhesive composition of the present invention, upon being properly cured, is a low outgassing material at room temperature when exposed to solar radiation or typical lighting conditions. Therefore, a natural application of it is in clean room and similar environment where low outgassing is preferred or required.

Surprisingly, the present inventors have discovered adhesive composition after cure of the present invention even does not outgas substantially when directly exposed to high energy UV light at wavelength as short as 157 nm for a prolonged period of time and that the outgassed material, in their relatively small amounts, do not tend to contaminate lithographic lens surfaces. This is contrary to typical wisdom that chemical bonds in polyhydrocarbons tend to break subject to the high energy of the UV photons.

As indicated supra, it is well known that the lenses used in deep and vacuum UV photolithography, such as 193 nm and 157 nm, particularly at 157 nm, contamination of the lens surface ($CaF_2$ lenses in 157 nm lithography, for example) can reduce the transmission of the lithographic illumination radiation and thus is highly undesirable. Room temperature curable silicone sealants are notorious for outgassing and strong tendency to contaminate lens surfaces and thus cannot be directly used in these settings.

Since the properly cured adhesive composition of the present invention has low outgassing, even when directly exposed to the lithographical UV radiation at wavelength as short as 157 nm, and the outgassed species do not tend to contaminate lens surfaces, it is ideal for use in lithographical devices at short wavelengths such as deep and vacuum ultraviolet radiation of 248 nm or shorter. It may be used to attach and join various components of these devices. Particularly, it is highly advantageous to be used as lens potting materials to securely fix the lens elements in their housings. Those lenses may be made of high purity fused silica, doped or undoped, or $CaF_2$ or other materials. The lens surfaces may be coated with antireflective coatings, such as magnesium fluoride, aluminum fluoride, calcium fluoride, gadolinium fluoride, thorium fluoride, lanthanum fluoride, yttrium fluoride, neodymium fluoride, dysprosium fluoride, sodium aluminum fluoride, alumina, silica, fluorine-containing silica, hafnia, scandium oxide, thorium oxide, zirconia, yttria, and the like. When used as lens potting material, the adhesive composition of the present invention can, for example, be applied to the desired locations of the lens element or lens housing before cure before or after the lens element is carefully aligned. The adhesive composition is subsequently exposed to visible or UV curing light or electron beam for a short period of time, thereby attaching and fixing the lens element to the housing. Such devices, especially the lithographic devices, comprising the cured composition of matter of the present invention, also constitute an aspect of the present invention.

The present invention is further illustrated by the following examples, which is for illustration purpose only and shall not be interpreted to limit the present invention as claimed in any way.

EXAMPLES

Example 1

The Present Invention

An UV curable composition was prepared by mixing the following components in the following weight percentages:

| | |
|---|---|
| 88.00% | Kraton Liquid Polymer L-207 |
| 10.00% | 1,12-dodecanediol dimethacrylate |
| 0.75% | Rhodorsil Photoinitiator 2074 |
| 1.00% | Esacure KIP 150 from Lamberti SpA |
| 0.25% | Isopropylthioxanthone |

Kraton Liquid Polymer L-207 is a hetero-telechelic polymer from Kraton Polymers consisting of a hydrogenated polybutadiene polymer that has a primary hydroxyl functionality on one end and an epoxidized isoprene functionality on the other end. The 1,12-dodecanediol dimethacrylate is Mhromomer BM-721 from Rohm America. Rhodorsil Photoinitiator 2074 is (tolylcumyl) iodonium tetrakis (pentafluorophenyl) borate available from Rhodia Inc. Esacure KIP 150 is oligo [2-hydroxy-2-methyl-1-[4-(1-methyl vinyl) phenyl] propane] available from Lamberti SpA. The isopropylthioxanthone is available from Albermarle Corp.

The viscous liquid mixture was drawn down on a glass plate using a 6 mil ($1.52 \times 10^{-2}$ mm) Bird applicator. The glass plate was placed into an aluminum purge box equipped with a UV transparent lid and a nitrogen inlet. The box was purged with nitrogen for one minute. Then a UV light (Xenon Model RC-500B) situated at 10 inches (25 cm) directly above the purge box was turned on. The sample was exposed for 10 minutes to the UV (~3000 mJ/cm$^2$) with continuous nitrogen purging. After 4 days at room temperature the 6 mil ($1.52 \times 10^{-2}$ mm) film was removed from the glass and tested for outgassing using a UV Gerstel Thermal Desorption/GCMS. For this technique, a 25 mg to 30 mg film sample was placed in an empty 7.0 inch (18 cm) long×6.0 mm O.D. glass cartridge and outgassed at 25° C. The 25° C. thermally desorbed VOC's were cryogenically collected for 60.0 minute time period using a constant 15.0 ml/minute helium purge. The outgassed volatiles were identified using GCMS with the following instrument conditions.

GCMS Instrument Conditions:

Instrument: Hewlett Packard 5989B Gas Chromatograph Mass Spectrometer

Carrier Gas: Helium Flow Rate 2.00 ml/minute Tank pressure: 50 psi ($3.4 \times 10^5$ Pa) TDS pressure gauge: 9.5 psi ($6.6 \times 10^4$ Pa)

Column: 30M×0.32 mm ID, 0.5 µm film DB-XLB Temp. Max. 350° C. Fused Silica Capillary Temp. Program: 50° C. hold for 5 minutes, ramp up @ 10° C./minute, to 300° C. and hold for 5 minutes Injection via: Gerstl TDS Thermal Desorption unit Detector: Mass Spectrometer Detector—Electron Impact Ionization mode Detector: Temp.: 250° C.

Injector Temp.: 275° C.

Source: 200° C.

Quadrupoles: 100° C.

Scan Range: mass 45 to mass 450

MS ON 0.0 minute

Run time: 35.0 minutes

Sampling rate: 1.0 A/D Samples 2

Scans/second: 0.7

Noise Threshold: 100

Example 2

Comparative Example

A series of commercially available adhesives were cured as recommended by their suppliers and tested for their outgassing rates in accordance with the same procedure described in EXAMPLE 1. The outgassing results were then compared with the outgassing rate of the cured composition of EXAMPLE 1. Comparison results are listed in TABLE I below.

TABLE I

| Adhesive | Sampling time/Sample Size | Total outgassed VOC's (µg) |
|---|---|---|
| Sylgard | After 5 Days - 27.8 mg | 24.98 |
| OG 133-5 | After 10 Days - 26 mg | 3.51 |
| EMCAST 714 | After 9 Days - 29.5 mg | 12.03 |

TABLE I-continued

| Adhesive | Sampling time/Sample Size | Total outgassed VOC's (µg) |
|---|---|---|
| Cyberbond 4696 | After 10 Days - 25.6 mg | 5.00 |
| DP-190 B/A Translucent | After 7 Days - 27.9 mg | 4.76 |
| OP-4-20641 (Dymax) | After 28 Days - 19.8 mg | 12.52 |
| OP-4-20647 (Dymax) | After 28 days - 10.6 mg | 8.80 |
| OP-4-20655 (Dymax) | Could not be analyzed (Rubber cement consistency) | |
| EXAMPLE 1 | After 4 Days - 27.5 mg | 0.33 |

Surprisingly, the total amount of outgassed VOC's are markedly lower for the EXAMPLE 1 composition than for all of the commercially available adhesives.

Example 3

Comparative Example

In another test, a commercial room temperature vulcanizing (RTV) silicone rubber was evaluated. RTV silicone materials, in general, are known as low outgassing, rubbery materials (see ASTM method D6411). This material, hereinafter referred to as SiRTV, is listed in the NASA Reference Publication 1061 "Outgassing Data for Selecting Spacecraft Materials" as a molding compound having a total mass loss (TML) of 1% or less and a collected volatile condensable materials (CVCM) of 0.10% or less. It was cured as recommended by the supplier. The cured material was stored at room temperature for different periods of time and then tested or outgassing as above. The test results for SiRTV are listed in TABLE II below:

TABLE II

| Sampling Time | Sample Size (mg) | Total Outgassed VOC's (µg) |
|---|---|---|
| Day #7 - 145.0 hours | 25.0 | 3.28 |
| Day #8 - 169.0 hours | 24.5 | 2.53 |
| Day #9 - 193.0 hours | 27.2 | 1.85 |
| Day #16 - 356.0 hours | 24.7 | 0.87 |
| Day #17 - 380.0 hours | 24.8 | 0.75 |
| Day #24 - 549.0 hours | 25.1 | 0.09 |

It should be noted that SiRTV has approximately an order of magnitude higher amount of total outgassed VOC's after 7 days than the EXAMPLE 1 composition has after 4 days. Also, the level of outgassed VOC's for SiRTV does not drop to below those of EXAMPLE 1 until 24 days after cure. It is also important to note that SiRTV is not photocurable and takes 7 days at room temperature to fully cure whereas the composition in EXAMPLE 1 fully cures in 10 minutes at room temperature under the UV light.

Example 4

The Present Invention

The composition in this example demonstrates that pigments can be added to the composition in EXAMPLE 1 to render the liquid material more visible and allow for easier monitoring of the flow of the potting compound before cure. Composition below is in weight percent.

87.92% Kraton Liquid Polymer L-207
10.00% 1,12-dodecanediol dimethacrylate
0.75% Rhodorsil 2074
1.00% Esacure KIP 150
0.25% Isopropylthioxanthone
0.08% 9R445 (24% organic red pigment in TMPTA paste from Penn Color Inc.) (TMTPA = Trimethylolpropane triacrylate)

Figure 2:
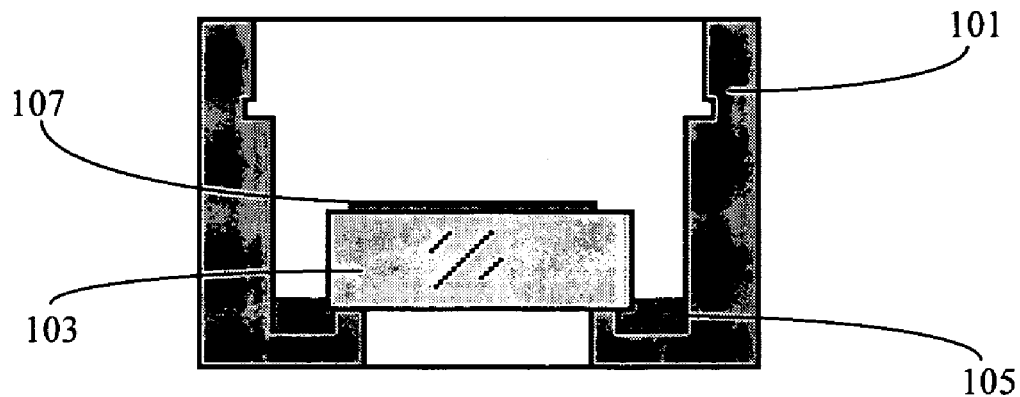
FIG. 2 is a schematic illustration of the cross-section of a lens element potted with the polymer material of the present invention with a layer of the polymer lens-potting material of the present invention applied on one surface of the lens.

This composition was used to pot three $CaF_2$ lens elements into a stainless steel housing to test for outgassing on exposure to 157 nm light. The cross-section of one potted lens element is illustrated in FIG. 1. In FIG. 1, 101 is the stainless steel lens housing, 103 is the $CaF_2$ lens element, and 105 is the lens potting material. Three lens elements potted in the same manner were stacked to form a lens assembly. The last element in the stack has a layer of the potting material 107 (5 mil or $1.25 \times 10^{-2}$ mm thick) applied to the surface, as shown in FIG. 2.

The potting material layer 107 on the last element was applied to the element prior to potting. The adhesive layer was cured in an inert environment ($N_2$ purge) for 15 minutes. The distance the element was from the bottom of the reflector housing was approximately 9-10 inches (23 to 25 cm). The adhesive layer was cured using an 80 mW/cm² UV curing flood source. The peak curing wavelength was 365 nm.

When potting, the elements were placed in the housing and the adhesive (potting material) was applied. The potting material was cured in an inert environment ($N_2$ purge) for two 15-minute cycles. The distance the cells were from the bottom of the reflector housing was approximately 9-10 inches (23 to 25 cm). The adhesive was cured using an 80 mW/cm² UV curing flood source. The peak curing wavelength was 365 nm. This data was obtained from the manufacture of the UV source (Adac Model Name: Curezone 2). The intensity was measured approximately two inches (5 cm) from the bottom of the reflector housing. The potted elements were placed in a nitrogen purge for 6 hours. After the purge, the cells were placed in a vacuum for a minimum of 8 hours. Twenty-four hours after the initial cure was completed, a secondary cure was performed. The cure was performed in an inert environment ($N_2$ purge) using a Xenon pulsed UV source. The Xenon unit was configured to irradiate at 10 pulses per second. The intensity of the pulses ensures the adhesive was irradiated through the entire thickness. The cure time was 10 minutes at a distance of approximately 5½ inches (14 cm) from the bottom of the reflector housing. The intensity of this source, as measured by the manufacture, was 1811 W/cm² (peak power) measured approximately 1.25 inches (3.18 cm) from the bottom of the reflector housing. The cells were placed in a vacuum for a minimum of 8 hours; followed by a purge cycle of six to eight hours. The potted elements were placed in a final purge cycle of 8 hours prior to 157 nm exposure.

Figure 3:
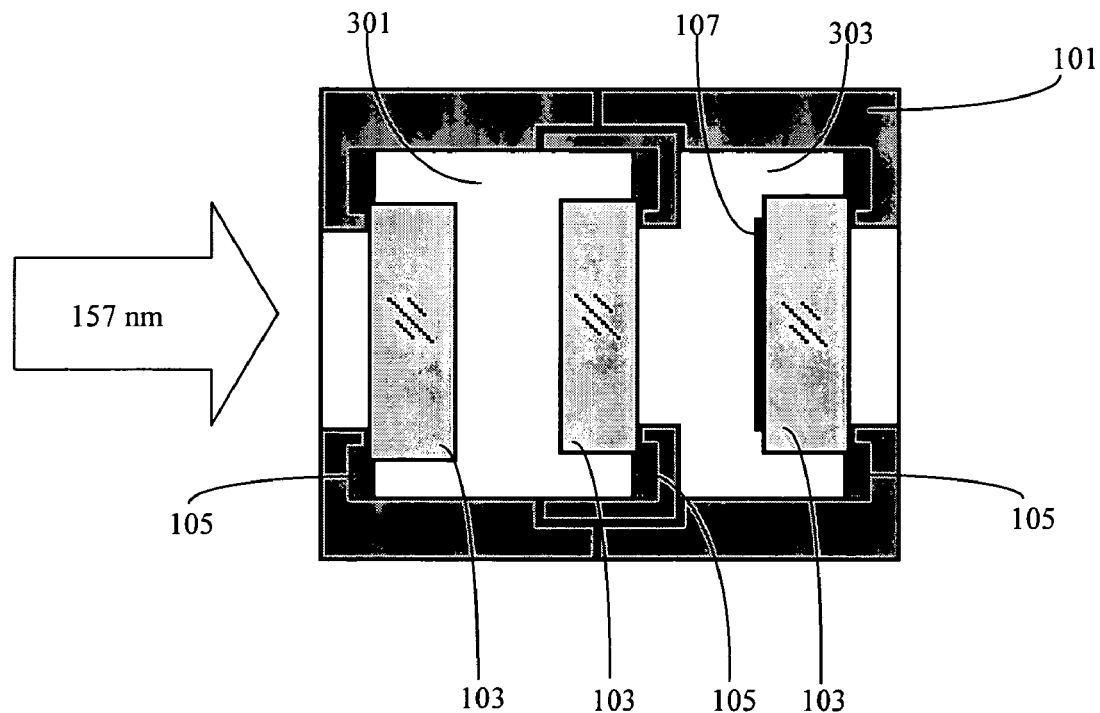
FIG. 3 is a schematic illustration of the cross-section of three stacked lens elements potted with the polymer lens-potting material of the present invention.

The three potted lens elements were then assembled in a stack as depicted in FIG. 3. Note the direction of the 157 nm laser light source and that the potting compound layer on the third lens element was directly in the 157 nm light path. In FIG. 3, chambers 301 and 303 between the lens elements are called "Before Window" and "After Window," respectively.

Figure 4:
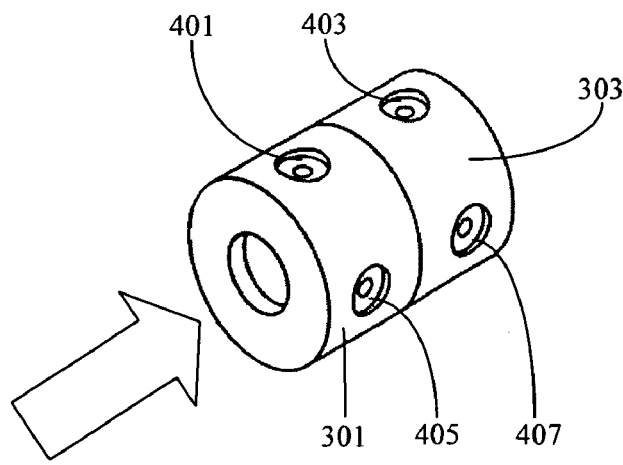
FIG. 4 is a schematic illustration of the slant view of the three stacked lens elements potted with the polymer lens-potting material of the present invention as illustrated in FIG. 3.

FIG. 4 shows an exterior view of the assembled cells with the purge gas input ports 401, 403 and gas exhaust ports 405, 407. 401 and 405 are the gas input port and exhaust port to the Before Window 301, respectively, and 403 and 407 are the gas input port and exhaust port to the After Window 303, respectively. Thus each chamber 301 and 303 has an independent input and exhaust port for $N_2$ purge.

Figure 5:
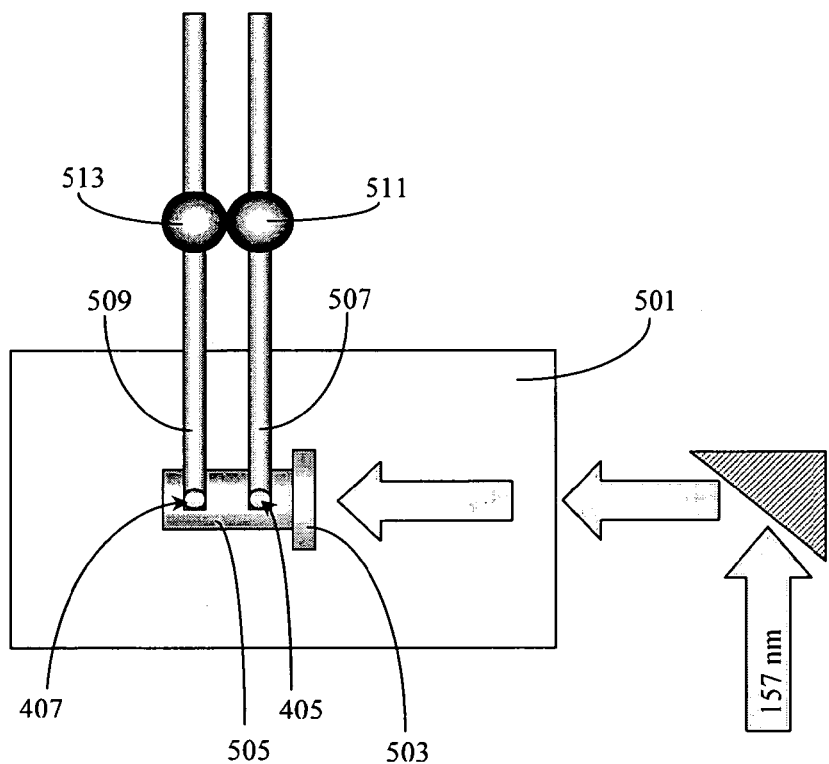
FIG. 5 is a schematic illustration of the apparatus set-up for testing the outgassing of the polymer lens-potting material of the present invention using the stacked lens elements illustrated in FIGS. 3 and 4.
Figure 6:
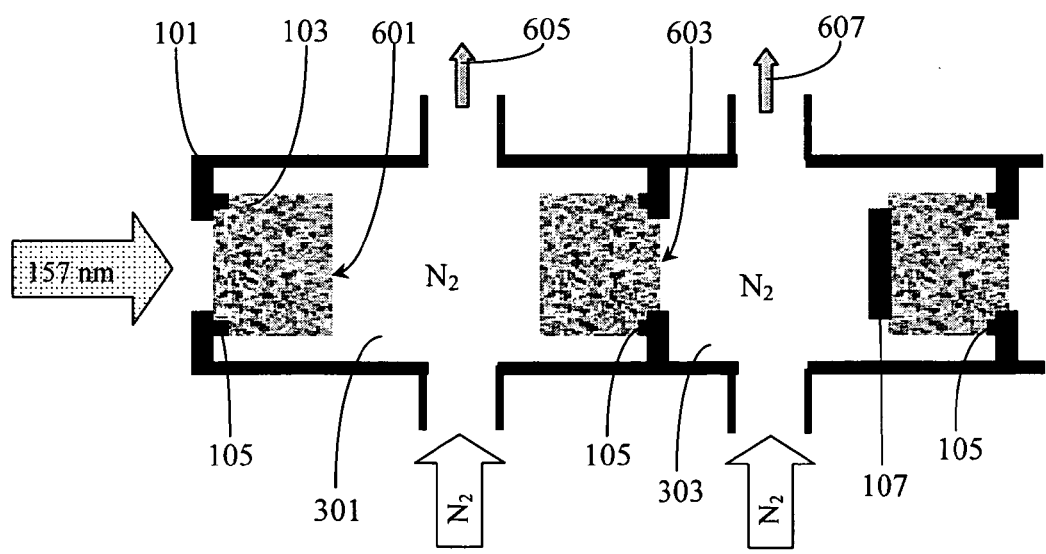
FIG. 6 is schematic illustration of the cross-section of the stacked lens elements in FIG. 5 potted with the polymer lens-potting material of the present invention during the test for outgassing.

A schematic illustration of the testing system setup is provided in FIG. 5. In this figure, 501 is the purge box in which the stacked lens elements 505 is placed. 503 is a fluorescing field stop, used to control the spot size and to ensure the 157 nm laser was operating properly. 507 and 509 are exhaust tubes connecting with Before Window exhaust port 405 and After Window exhaust port 407, respectively. Traps 511 and 513 are installed on the exhaust tubes 507 and 509, respectively, in order to sample the purge exhaust gases. FIG. 6 is a schematic view of the cross-section of the stacked lens elements for further illustration of the purging and testing process. Upon exposure to 157 nm radiation, the surfaces 601 and 603 of the first and second lens elements will be analyzed for surface contamination caused by the outgassing of the lens potting material by using ToF-SIMS (Time-of-Flight—Secondary Ion Mass Spectroscopy).

Figure 7:
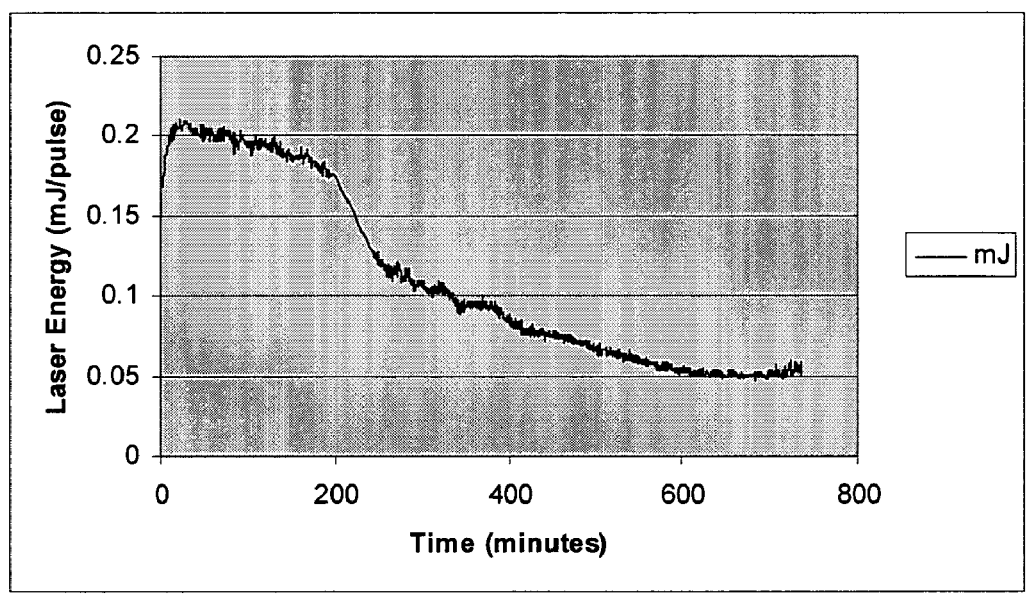
FIG. 7 is a typical energy decay curve of a 157 nm laser source used in the apparatus set-up for testing the outgassing of the lens-potting material of the present invention as illustrated in FIG. 5.

The assembled cells were then purged with nitrogen at 15 psi ($1.0 \times 10^5$ Pa). Purge gas from each chamber was sampled for 48 hours at approximately 0.5 liters per minute. The laser was configured to have a repetition rate of 100 Hz. The fluence at the cell was 0.06 mJ/cm$^2$, when the laser gas was fresh. A typical gas fill would last for approximately 750 minutes or 4500000 pulses before the pulse energy would decay. Integrated energy over one gas fill was about 180 J/cm$^2$. A typical energy decay curve is displayed in FIG. 7. Each sample ran for 48 hours with four fills during that time period at approximately the same intervals for each sample.

Carbotrap 300 multi-bed adsorbent resin traps 511 and 513 were used to sample the atmosphere from the Before Window and After Window of the experimental setup (see FIG. 5). The adsorbent resin trap was assembled on the outlet port of each chamber and the volatile organic compounds (VOC's) from the cell atmosphere were collected on the trap as the gas passed over the adsorbent. The adsorbent resin trap was connected directly to the cell exit port via ¼ inch (0.63 cm) Swagelok fitting. An external vacuum pump was needed to achieve the correct flow because the resin bed offered too much restriction to the box exhaust flow. The experimental atmosphere was sampled at a flow rate of 0.5 liters/minute for 48 hours.

The adsorbent resin trap samples were run using a Gerstel Thermal Desorption/GCMS. The VOC's were thermally desorbed from the adsorbent resin at 325° C. for 15.0 minutes in a constant 15.0 ml/minute helium purge. The outgassed VOC's were cryogenically trapped and identified using GCMS (Gas Chromatography-Mass Spectrometry). The detection limit of the technique is ≈500 ppt (parts per trillion) based on a 720 liter sample volume (400 ng on column).

The total VOC concentration of outgassed products after 48 hours of 157 nm light exposure is shown in TABLE III below.

TABLE III

| Composition of | Total VOC Concentration (ppb) | |
| --- | --- | --- |
| | Before Window | After Window |
| EXAMPLE 4 (Present Invention) | 2.60 | 3.27 |
| EXAMPLE 5 (SiRTV) | 12.10 | 21.87 |

In addition to the need for having a minimal amount of outgassed products, the type of outgassed products is also important. The outgassed products and their concentration for the EXAMPLE 4 formulation is shown in TABLE IV below.

TABLE IV

| VOC Name (Retention time, min) | VOC Concentration (ppb) | |
| --- | --- | --- |
| | Before Window | After Window |
| Benzene (1.86) | 0.38 | 0.02 |
| Toluene (3.33) | 0.25 | Not Detectable |
| Isopropyl Benzene (7.88) | 0.32 | 0.23 |
| Iodobenzene (13.27) | 0.7 | 1.21 |
| 4-Iodoisopropyl benzene (15.95) | 0.95 | 1.81 |

For the lens potting material of this example of the present invention, ToF-SIMS analysis of lens surfaces 601 and 603 of all samples showed abundant $Ca^{+2}$ ion signals suggesting only partial surface of contamination. Contamination species of the surfaces include: silicone from handling, packaging, unclean environment; hydrocarbons both aliphatic and aromatic; phthalates; sodium; sulfur compounds; iodine; and chlorine. Iodine is likely the result of the cationic photoinitiator Rhodorsil 2074 used in the adhesive formulation. In addition, the various aromatic hydrocarbon signals could also come from this compound and other minor additives. No significant presence of methacrylate or epoxy rubber was detected, which are the main constituents of the adhesive. It appears that the iodine-containing photoinitiator was the most dominantly outgassed species that adsorbs onto the lens surfaces. Boron was present at ultra-trace level and it is difficult to determine if it was outgassed from the B-containing initiator. Silicone was detected at small levels on these samples also even though the adhesive itself did not-contain any silicone. This observation points to the tendency of various contaminants to adsorb onto the $CaF_2$ surfaces. It is highly recommended silicone contamination be avoided because of its tenacious bonding to the surface and associated difficulty in removal.

Example 5

Comparative Example

In this example, SiRTV, a room temperature vulcanizing silicone rubber described in EXAMPLE 3, supra, was used to pot $CaF_2$ lenses and tested for outgassing on exposure to 157 nm radiation using the same method, equipment and procedure in accordance with EXAMPLE 4, supra, with the exception that for SiRTV, after the lenses were potted, SiRTV was allowed to cure for ten days at ambient temperature (70° F.) prior to any further work. The 157 nm exposure commenced on the eleventh day. Data of offgassed VOC's were obtained. Total VOC concentration data are reported in TABLE III. It was found that the VOC's from SiRTV were cyclosiloxane hexamethyl-cyclotrisiloxane (D-3) to hexadecamethylcyclooctasiloxane (D-8). The three cyclosiloxanes with the highest concentration were decamethylcyclopentasiloxane (D-5, approximately 13%) dodecamethylcyclohexasiloxane (D-6, approximately 40%) and tetradecamethylcyclohepasiloxane (D-7, approximately 25%). The relative siloxane concentration profile was similar for each sample with the only difference in overall concentration. The peak identification and associated retention time is listed in Table V below.

TABLE V

| SiRTV Silicone adhesive | VOC | Concentration % |
|---|---|---|
| 8.75 min | D-4 | 2% |
| 11.84 min | D-5 | 12% |
| 12.31 min | Linear D-5 | 13% |
| 14.66 min | D-6 | 40% |
| 17.06 min | D-7 | 25% |
| 19.13 min | D-9 | 6% |

These siloxane materials are particularly problematic for lens potting. In addition, it has been found that on long term exposure to 157 nm light, the siloxanes can decompose into compounds that can react with the lens surface forming a permanent layer that negatively affects lens function.

In addition to measuring outgassing, ToF-SIMS surface analysis of the $CaF_2$ lens surfaces 601 and 603 was conducted. The results were as follows.

For SiRTV, all samples mounted using this silicone based potting compound were covered with silicone to the extent that the Ca signal from the $CaF_2$ lens itself sample was almost completely blanked. The spectra shows dominant ion signals from silicone or polydimethylsiloxane (PDMS). Ion signals of Ca and F were detected at trace levels only. Since ToF-SIMS spectra essentially originate from the outermost monolayer, this observation means that silicone completely covers the surface. Silicone is a well known and useful material, however, it is also a very common contaminant notorious for rapid spreading and difficult removal. Silicone can polymerize and form a siloxane network. In addition, it can bond with the $CaF_2$ surface in a covalent manner such as Ca—O—Si. Given its dominant migration to the $CaF_2$ surface, this compound is highly undesirable for use as a $CaF_2$ lens potting compound.

Phthalate, a common plasticizer and a ubiquitous contaminant, was also detected on all samples. Phthalate may come from polymeric packaging materials and from exposure to the environment.

Sodium from handling and contamination was also detected at trace levels.

In summary and in comparison to EXAMPLE 4, the silicone-based adhesive SiRTV leads to significant outgassing and completely envelopes the lens surface. In contrast, the hydrocarbon-based lens potting material of EXAMPLE 4 causes little outgassing. The dominant species for the latter were iodine-based aromatic photoinitiator photoproducts. Silicone contamination occurs even in the latter case highlighting the need for clean conditions for preparing lens assemblies. Other contaminants include Na, various hydrocarbons, and phthalates at minor levels likely from the environment.

Example 6

The Present Invention

A lens potting material was prepared by mixing the following materials in the following weight percentages:

| | |
|---|---|
| 98.92% | FM003-53 Hydrogenated rubber diacrylate from Designer Molecules Inc., San Diego, CA |
| 0.50% | Irgacure 369 from Ciba Geigy Corp., Tarrytown, NY |
| 0.25% | Isopropylthioxanthone |
| 0.25% | Speedure PDA from Aceto Corp, Lake Success, NY |
| 0.08% | 9R445 (24% organic red pigment in TMPTA paste from PennColor, Inc.) |

Speedure PDA = poly[oxy(methyl-1,2-ethylenediyl), α-(4-dimethylamino) benzoyl-ω-butoxy-]
Irgacure 369 = 2-Benzyl-2-N,N-dimethylamino-1-(4-morpholinophenyl)-1-butanone This composition and the composition of EXAMPLE 4 were poured into a 1 cm×2 cm×2 mm deep glass mold. The mold was placed in a box with a UV transparent (High Purity Fused Silica) lid and purged with nitrogen. The samples were cured with a Xenon Model RC740 UV lamp source at 10 pulse/sec and 5½ inches (14 cm) height. A separate sample was cured for each of the exposure times listed in TABLE VI below. Outgassing was evaluated using Thermal Desorption/GCMS.

TABLE VI

| | Total % Weight Loss (Calculated Wgt/Wgt) for these Exposure Times | | | | | |
|---|---|---|---|---|---|---|
| | 2.0 min | 4.0 min | 8.0 min | 16.0 min | 32.0 min | 64.0 min |
| EXAMPLE 4 Composition | 0.00154 | 0.00024 | 0.00038 | 0.00031 | 0.00035 | 0.00033 |
| EXAMPLE 6 Composition | 0.00192 | 0.00115 | 0.00103 | 0.00100 | 0.00046 | 0.00027 |

The samples were run neat using Gerstel Thermal Desorption/GCMS. A 80 mg to 100 mg film sample was placed in an empty 7.0 inch (18 cm) long×6.0 mm O.D. Glass cartridge and outgassed at 25° C. The 25° C. thermally desorbed VOC's were cryogenically collected at 60.0 minute time period using a constant 15.0 ml/minute helium purge. The outgassed volatiles were identified using GCMS. Data of total weight loss were obtained and reported in TABLE VI. Amount of outgassing is indicated by these total weight loss data.

Note that the total outgassed products after 64.0 minutes of UV exposure is approximately the same for both the EXAMPLE 4 and 6 compositions. From the total weight loss percentage data, it appears that, for the composition of EXAMPLE 4, curing time longer than 16 minutes does not alter outgassing amount significantly, indicating that the composition was fully cured after 16 minutes of UV exposure. However, for the composition of EXAMPLE 6, there is a general trend that below 64 minutes curing time, the longer the curing time, the lower the total outgassing amount.

Example 7

The Present Invention

| | |
|---|---|
| 50.00% | Kraton L-207 |
| 16.00% | DD-36 Dimer diol (Jarchem Industries, Newark, NJ) |
| 30.00% | TJFS20 silica powder (4F International Co., Gainesville, FL) |
| 4.00% | Dispersion of 5% Cyracure 6974 (Dow Chemical) in Kraton L-207 (Cyracure 6974 is a 50% solution of mixed triarylsulfonium hexafluoroantimonate salts in propylene carbonate from Dow Chemical.) |

This composition (shown above in weight percent) was drawn down onto a 4 inch (10 cm) diameter silicon wafer using a 6 mil ($1.52 \times 10^{-2}$ mm) Bird applicator on top of 10 mil ($2.54 \times 10^{-2}$ mm) thick shims to give a layer about 16 mil ($4.06 \times 10^{-2}$ mm) thick. The coated silicon wafer was placed in a box with a UV transparent (High Purity Fused Silica) lid and purged with nitrogen. The sample was cured with a Xenon Model RC-740 UV lamp source at 10 pulse/sec, 5½ inches (14 cm) height for 30 minutes. After storage in a desiccator for 48 hours, the sample was exposed to 157 nm radiation for ~7.5 J/cm² at a fluence of ~51 µJ/cm² pulse at 200 Hz for ~12 minutes. The headspace vapors were collected and the outgassed products were:

| | |
|---|---|
| 82% | Simple saturated alkanes |
| 16% | Functionalized alkanes (alkenes mostly, some alcohols) |
| 2% | Aromatic compounds (benzene only) |

There was no detected silicon, iodine, or sulfur compounds, just hydrocarbons. The top few chemicals found, along with their signal (not concentration) as a percentage of the total is listed below.

| | |
|---|---|
| Pentane | 24.711 |
| Butane | 23.246 |
| Hexane | 7.893 |
| Pentanal, 3-methyl- | 5.475 |
| Heptane | 4.265 |
| Butane, 2-methyl- | 4.251 |
| Octane | 3.016 |
| 1-Heptene | 2.915 |
| Benzene | 2.288 |
| Hexane, 3-methyl- | 1.815 |
| Pentane, 3-methyl- | 1.744 |
| Tridecane | 1.419 |
| Cis-1-Butyl-2-methylcyclopropane | 1.374 |
| Nonane | 1.322 |
| Hexane, 2,4-dimethyl- | 1.298 |
| Undecane, 6-methyl- | 1.11 |

This example indicates that inert inorganic fillers can be added into the adhesive composition of the present invention while still attaining low outgassing.

Example 8

The Present Invention

| | |
|---|---|
| 58.00% | Kraton L-207 |
| 8.00% | DD-36 Dimer diol |
| 30.00% | TJFS05 silica powder |
| 4.00% | Dispersion of 5% Cyracure 6974 in Kraton L-207 |

The above composition (in weight percent) was UV cured as in EXAMPLE 4. The sample was then subjected to ASTM-E-595-93 (1999) Standard Test Method for Total Mass Loss and Collected Volatile Condensable Materials from Outgassing in a Vacuum Environment. The results show the above UV cured composition passes all three of the specifications of this test.

TABLE VII

| | EXAMPLE 8 | Specification |
|---|---|---|
| % Total Mass Loss | 0.652% | <1.00% |
| % Collected Volatile Condensable Materials | 0.096% | <0.10% |
| % Water Vapor Regain | 0.080% | <0.20% |

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A composition of matter consisting essentially of a reaction product of
   (i) a photo or electron beam curable material component comprising a material having the backbone of a completely or substantially completely hydrogenated hydrocarbon based rubber material, which is completely or substantially free of carbon-carbon double and triple bonds, and bears at least one photo or electron beam polymerizable terminal or pendant group;
   (ii) a photoinitiator/photosensitizer component having essentially no volatility at room temperature and also yielding photoproducts after exposure to actinic radiation that have minimal or no volatility at room temperature;
   (iii) an optional viscosity adjustment component that is either homopolymerizable or is capable of copolymerizing with the photo or electron beam curable material component of (i); and
   (iv) an optional inert filler,
wherein, the composition of matter, when cured, has a low outgassing rate such that it passes the ASTM-E-595-93 (1999) test and a low outgassing rate when exposed to ultraviolet radiation having a wavelength less than or equal to about 248 nm.

2. A composition of matter in accordance with claim 1, wherein the photo or electron beam curable material component of (i) comprises a functionalized material bearing at least one photo or electron beam polymerizable terminal or pendant group selected from the group consisting of: polybutadiene, polyisoprene, polyethylene propylene rubber and combinations thereof, which material comprises a backbone that is completely hydrogenated or substantially completely hydrogenated and completely or substantially completely free of carbon-carbon double and triple bonds.

3. A composition of matter in accordance with claim 2, wherein the photo or electron beam curable material component of (i) is functionalized by at least one polymerizable terminal or pendant group selected from the group consisting of: acrylate, methacrylate, acrylamide, maleimide, thioacrylate, thiomethacrylate, vinyl sulfide, itaconate, crotonate, styrene and N-vinyl amide, hydroxyl, thiol, epoxy, oxetane, episulfide, vinyl ether, propenyl ether, allyl ether, and compatible mixtures and/or combinations thereof.

4. A composition of matter in accordance with claim 3, wherein the photo or electron beam curable material component of (i) is functionalized by at least one polymerizable terminal or pendant group selected from the group consisting of: epoxy, acrylate and methacrylate.

5. A composition of matter in accordance with claim 1, wherein the photoinitiator/photosensitizer is selected from the group consisting of the following compounds and/or mixtures in purified and/or diluted form:
 oligo [2-hydroxy-2-methyl-1-[4-(1-methylvinyl)phenyl] propanone];
 oligo [2-hydroxy-2-methyl-1-[4-(1-methylvinyl)phenyl] Propanone], diluted in tripropylene glycol diacrylate (25% TPGDA);
 1-[4-(4-benzoylphenylsulfonyl)phenyl]-2-methyl-2-(4-methylphenylsulfonyl) propan-1-one;
 bis(2,4,6-trimethylbenzoyl)-Phenyl phosphine oxide;
 2-benzyl-2-N,N-dimethylamino-1-(4-morpholino-phenyl)-1-butanone;
 bis η5-(2,4-cyclopentadien-1-yl) bis(2,6-difluoro-3-(1H-pyrrol-1-yl) phenyl)titanium;
 bis (2,6-dimethoxybenzoyl)-2,4,4-trimethylpentyl phosphine oxide;
 2-oxepanone, homopolymer, 2-[[4-[2-methyl-2-(4-morpholinyl)-1-oxopropyl]phenyl]thio]ethyl ester;
 mixture of 2-isopropylthioxanthone and 4-isopropylthioxanthone;
 1,3-dimethyl-2-hydroxy-9H-thioxanthen-9-one, 2-ethylhexyl ester;
 4,4'-bis(methylethylamino)benzophenone;
 4,4'-bis(isopropylphenoxy)benzophenone;
 4-benzoyl-4'-methyldiphenyl sulfide;
 2-chloro-thioxanthone;
 1-chloro-4-propoxythioxanthone;
 2,4-diethylthioxanthone;
 poly[oxy(methyl-1,2-ethanediyl)], α-[4-(dimethylamino) benzoyl-ω-butoxy-;
 2,2'-bis-(2-chlorophenyl)-4,5,4',5'-tetraphenyl-2'H-<1, 2'>biimidazolyl;
 (tolylcumyl)iodonium tetrakis(pentafluorophenyl) borate;
 [4-[(2-hydroxytetradecyl)oxy]phenyl]phenyliodonium hexafluoro antimonate;
 mixture of bis(4-dodecylphenyl)iodonium hexafluoroantimonate, isopropylthioxanthone, and C12+C14 alkylglycidyl ethers;
 mixture of bis(4-dodecylphenyl)iodonium hexafluoroantimonate and C12+C14 alkylglycidyl ethers;
 phenyl-4-octyloxyphenyl iodonium hexafluoro antimonate;
 mixture of triaryl sulfonium hexafluoroantimonate salts;
 mixture of triaryl sulfonium hexafluorophosphate salts;
 perylene;
 anthracene;
 1,2-benzanthracene;
 9-n-butoxyanthracene;
 9,10-di-n-butoxy anthracene;
 9,10-di-n-propoxy anthracene;
 9,10-diethoxy anthracene;
 anthrone;
 pyrene;
 2-ethyl-9,10-dimethoxy anthracene;
 2,5-diphenyl-1,3,4-oxadiazole;
 diphenyl anthracene;
 9,10-dimethylanthracene;
 1,3-diphenyl-2-pyrazoline;
 1,3-diphenylisobenzofuran;
 N,N,N',N'-tetraphenyl benzidine; and
 N,N,N',N'-tetraphenyl phenylene diamine;
and compatible mixtures thereof and/or compatible combinations thereof.

6. A composition of matter in accordance with claim 1, wherein the inert filler is an inorganic filler selected from the group consisting of alumina, crystobalite, aluminum trihydroxide, talc, feldspar, calcium carbonate, mica, clay, wallastonite, nepeleline syenite, silica, and compatible mixtures thereof and compatible combinations thereof.

7. A cured composition of matter obtained by exposing the composition of claim 1 to visible light, ultraviolet light or electron beam.

8. A composition of matter in accordance with claim 7, which has a low modulus ranging from 25 to 10,000 psi ($1.7 \times 10^5$ to $6.8 \times 10^7$ Pa).

9. A composition of matter in accordance with claim 7, which has a Tg of equal to or lower than 25° C.

10. A process for producing a cured composition of matter having low outgassing rate and low modulus between 25 and 10,000 psi ($1.7 \times 10^5$ to $6.8 \times 10^7$ Pa), comprising the following steps:
 (A) providing a rubber material (i) (a) having a backbone that is completely or substantially completely free of carbon-carbon double bond and triple bond and (b) comprising terminal and/or pendant groups tat are photo and/or electron beam polymerizable;
 (B) mixing the material (i) with a photoinitiator/photosensitizer (ii) having essentially no volatility at room temperature and also yielding photoproducts after exposure to actinic radiation that have minimal or no volatility at room temperature; (iii) an optional viscosity adjustment component that is either homopolymerizable or is capable of copolymerizing wit material (i); and (iv) an optional inert filler;
 (C) curing the mixture resulting from step (B) by visible light, UV light or electron beam to form a cured composition of matter having low outgassing rate and low modulus, wherein the cured composition has an outgassing rate tat is sufficient to pass the ASTM-E-595-93 (1999) test and a low outgassing rate when exposed to ultraviolet radiation having a wavelength less than or equal to about 248 nm.

11. A process in accordance with claim 10, wherein step (A) comprises the following steps:
 (A1) providing a completely or substantially completely hydrogenated hydrocarbon-based rubber material (i') completely or substantially completely free of carbon-carbon double bond and triple bond having reactive terminal and/or pendant groups; and
 (A2) modifying the rubber material (i') into material (i) by introducing photo and/or electron beam polymerizable terminal and/or pendant groups to the rubber material (i') by allowing the reactive terminal and/or pendant groups of (i') to react with agents having the photo and/or electron beam polymerizable groups.

12. A composition of matter in accordance with claim 1, wherein the photo or electron beam curable material component of (i) is functionalized by at least one polymerizable terminal or pendant group selected from the group consisting of: acrylate, methacrylate, acrylamide, maleimide, thioacrylate, thiomethacrylate, vinyl sulfide, itaconate, crotonate, styrene and N-vinyl amide, hydroxyl, thiol, oxetane, episulfide, vinyl ether, propenyl ether, allyl ether, and compatible mixtures and/or combinations thereof.

13. A composition of matter in accordance with claim. 1, which is essentially free of silicone.

14. A process according to claim 12, wherein steps (B) and (C) are performed in an environment essentially free of silicone.

* * * * *